(12) United States Patent
Kaplan (10) Patent No.: US 6,725,156 B2
(45) Date of Patent: Apr. 20, 2004

(54) METHOD AND SYSTEM FOR PROVIDING BACKUP DRIVING INSTRUCTIONS WITH A NAVIGATION SYSTEM

(75) Inventor: Lawrence M. Kaplan, Northbrook, IL (US)

(73) Assignee: Navigation Technologies Corp., Chicago, IL (US)

( * ) Notice: Subject to any disclaimer, the term of this patent is extended or adjusted under 35 U.S.C. 154(b) by 0 days.

(21) Appl. No.: 09/852,879

(22) Filed: May 10, 2001

(65) Prior Publication Data
US 2002/0169549 A1 Nov. 14, 2002

(51) Int. Cl.[7] .................. G01C 21/00; G04B 19/22; G08G 1/123
(52) U.S. Cl. .................. 701/209; 701/202; 342/457
(58) Field of Search .................. 701/202, 209, 701/208, 211, 213, 217, 220, 210, 201, 207; 340/990, 995, 988; 342/457, 357.1, 357.13

(56) References Cited

U.S. PATENT DOCUMENTS

| 3,749,333 | A | * | 7/1973 | Lykken et al. ............. 244/3.15 |
| 5,087,919 | A | | 2/1992 | Odagawa et al. ........... 342/357 |
| 5,113,185 | A | | 5/1992 | Ichikawa ................... 340/995 |
| 5,243,528 | A | * | 9/1993 | Lefebvre .................... 364/449 |
| 5,283,743 | A | | 2/1994 | Odagawa .................... 364/457 |
| 5,610,821 | A | * | 3/1997 | Gazis et al. .............. 364/444.2 |
| 5,724,316 | A | * | 3/1998 | Brunts ........................ 368/10 |
| 5,818,356 | A | | 10/1998 | Schuessler .................. 340/995 |
| 6,034,626 | A | * | 3/2000 | Maekawa et al. ............ 340/995 |
| 6,064,925 | A | | 5/2000 | Kobayashi et al. ............ 701/23 |
| 6,169,515 | B1 | * | 1/2001 | Mannings et al. ........ 342/357.1 |
| 6,169,956 | B1 | | 1/2001 | Morimoto et al. ........... 701/209 |
| 6,259,405 | B1 | * | 7/2001 | Stewart et al. .............. 342/457 |
| 6,314,369 | B1 | * | 11/2001 | Ito et al. .................... 701/209 |
| 6,336,073 | B1 | * | 1/2002 | Ihara et al. ................. 701/202 |
| 6,400,690 | B1 | | 6/2002 | Liu et al. .................... 370/252 |
| 6,484,093 | B1 | | 11/2002 | Ito et al. .................... 701/211 |
| 2002/0029108 | A1 | | 3/2002 | Liu et al. .................... 701/208 |

* cited by examiner

Primary Examiner—Tan Q. Nguyen
Assistant Examiner—Dalena Tran
(74) Attorney, Agent, or Firm—Jon D. Shutter; Frank J. Kozak; Lawrence M. Kaplan (57) ABSTRACT

A navigation method and system are disclosed whereby users of the systems are provided with backup driving instructions. A wireless communications system allows end users' computing devices to receive dynamic route guidance from a remotely located navigation services provider. The dynamic route guidance provides each end user with maneuvering instructions at appropriate locations along a route to a desired destination. In addition to the dynamic route guidance, the navigation service provider also provides the end users with backup driving instruction data. The backup driving instruction data can be used by an end user's computing device to provide backup driving instructions for traveling to the destination. The backup driving instruction data can be used in case wireless communications is interrupted.

23 Claims, 6 Drawing Sheets

METHOD AND SYSTEM FOR PROVIDING BACKUP DRIVING INSTRUCTIONS WITH A NAVIGATION SYSTEM

BACKGROUND OF THE INVENTION

The present invention relates to navigation systems, and more particularly, the present invention relates to a feature provided by a navigation system whereby a user of the system is provided with backup driving instructions.

There are various computer architectures for navigation systems that provide navigation-related features (including map-related features). In one type of architecture for a navigation system, end users (such as vehicle drivers, passengers, and others) use a wireless communications system to obtain navigation-related services or data from a remotely located navigation services provider. The end users use various computer platforms (e.g., different kinds of electronic devices and/or systems) to connect to the wireless communications system in order to access the remotely located navigation service provider. Associated with the remotely located navigation services provider is a geographic database. When an end user uses his/her computer platform to request a navigation-related service or data, the remotely located navigation service provider accesses the geographic database associated therewith and then provides the requested service or data to the requesting end user's computer platform via the wireless communications system.

This type of navigation system architecture provides several advantages. One advantage relates to providing updated data. There is a continuing need to update the data used by a navigation system. For example, new streets are built, road construction closes roads, detours are established, new businesses open, posted speed limits change, new turn restrictions are established at intersections, streets are renamed, and so on. These kinds of changes can affect travel through a geographic region. Accordingly, the data used by a navigation system should be updated on a regular basis to accurately reflect changes in the represented geographic features. A computer architecture in which end user computing platforms obtain data wirelessly from a single central geographic database associated with a navigation services provider affords an advantage with respect to the updating of the geographic data. With such a computer architecture, updates need to be applied only to the central database.

Although there are advantages associated with a navigation system architecture in which individual end user computer platforms request and obtain navigation-related services and data wirelessly from a single central geographic database associated with a navigation services provider, there are considerations to be addressed. One consideration relates to the need for continuous availability of navigation-related services and data wirelessly. According to one type of navigation system architecture, a navigation services provider provides navigation-related services and data to an end user while the end user is traveling within a coverage area. A wireless communications system, associated with the navigation services provider, is available continuously (or relatively continuously) throughout the coverage area. End users located throughout the coverage area use their computing devices to access the wireless communications system in order to obtain navigation-related services and data from the navigation services provider.

According to this type of system, each end user maintains one or more relatively continuous sessions with the navigation services provider. During each session, the end user and the navigation services provider may exchange several data messages. As an example, the end user may communicate a message to the navigation services provider requesting driving instructions for traveling to a destination. In response, the navigation services provider sends a message that includes instructions for starting on the route to the destination. As the end user follows the route, the end user sends additional messages to the navigation services provider. Each additional message from the end user to the navigation services provider may include an update of the end user's position as he/she proceeds along the route. As messages from the end user are received by the navigation services provider, the navigation services provider prepares and sends new messages containing additional instructions for continuing along the route. In this manner, the navigation services provider can provide the end user with instructions that are timely and relevant with respect to the end user's progress along the route.

With this type of system, it is not necessary that the end user and navigation services provider maintain a continuous communications link. However, if communications between the end user and the navigation services provider are interrupted for a relatively long a period of time, the end user may not have downloaded sufficient information from the navigation services provider for continuing further along the calculated route toward the destination. Interruptions in communications between end users and the navigation services provider may occur for various reasons, such as equipment failure, heavy usage, and so on. The interruption of navigation-related services may be inconvenient for some end users. Accordingly, it would be preferable to reduce or minimize any inconvenience to end users of this navigation system architecture occasioned by the lack of navigation-related services.

SUMMARY OF THE INVENTION

To address these and other objectives, the present invention comprises a navigation method and system whereby users of the systems are provided with backup driving instructions. A wireless communications system allows end users' computing devices to receive dynamic route guidance from a remotely located navigation services provider. The dynamic route guidance provides each end user with maneuvering instructions at appropriate locations along a route to a desired destination. In addition to the dynamic route guidance, the navigation service provider also provides each end user with backup driving instruction data. The backup driving instruction data are used to provide each end user with backup driving instructions for traveling to the end user's desired destination. The backup driving instruction data are used in case wireless communications between the end user and the navigation services provider are interrupted.

DETAILED DESCRIPTION OF THE PRESENTLY PREFERRED EMBODIMENTS

I. Overview of Navigation System

Figure 1:
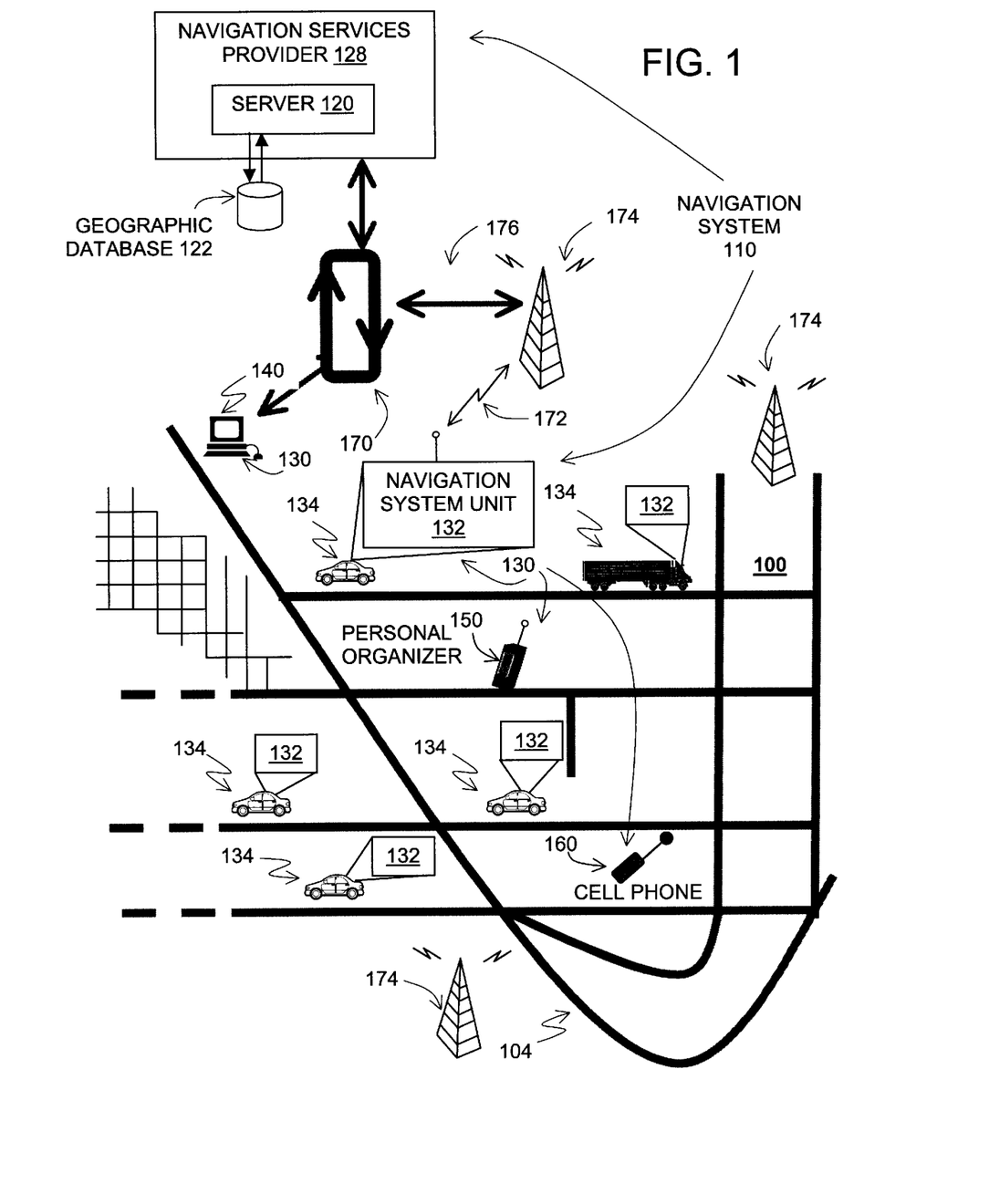
FIG. 1 is a map showing a geographic region and components of a navigation system that services the geographic region.

FIG. 1 shows a geographic region 100. The geographic region 100 may correspond to a metropolitan or rural area, a state, a country, or combinations thereof, or any other area of comparable size. Located in the geographic region 100 is a road network 104.

A navigation system 110 serves end users (e.g., vehicle drivers and passengers, as well as other persons) in the geographic region 100. The navigation system 110 is used by the end users to obtain navigation-related services (including map-related services) with respect to the geographic region 100. The navigation-related services include information about travel along the road network 104, including route calculation and guidance, people and business finding services (e.g., electronic yellow and white pages), maps, point of interest searching, destination selection, and so on.

The navigation system 110 is a combination of hardware, software and data. The navigation system 110 includes remote components (i.e., hardware, software or data located at a central location remote from the end users) and local components (i.e., hardware, software, or data located physically with each end user).

Included among the remote components of the navigation system 110 is a navigation services server 120. Associated with the navigation services server 120 is a geographic database 122. The navigation services server 120 and the geographic database 122 are maintained and operated by a navigation services provider 128.

The local components of the navigation system 110 include the various computer platforms 130 operated by the end users to request and obtain navigation-related and map-related features and geographic data from the navigation services provider 128. These various computer platforms 130 (also referred to as "end user computing platforms" or "client computing platforms") may include navigation system units 132 located in vehicles 134, personal computers 140, personal organizers (e.g., PDAs, PalmPilot®-type devices) 150, portable phones 160, or any other types of computing device that has the appropriate hardware and software to access the navigation services provider 128 over a data network 170.

The data network 170 may use any suitable technology and/or protocols that are currently available, as well as technology and/or protocols that become available in the future. For example, the data network may use WAP, TCP/IP, etc. More than one protocol may be used in the data network 170 with appropriate conversions. The data network 170 may be part of, or connected to, the Internet.

A portion of the network 170 may include a wireless portion 172. The wireless portion 172 of the data network 170 enables two-way communication between the mobile end user computing platforms 130 and the service provider 128. The wireless portion 172 may be implemented by any suitable form of wireless communication, including cellular, PCS, satellite, FM, radio, or technologies that may be developed in the future. The wireless portion 172 may include one or more transmitters 174, such as a transponder tower, an antenna tower, an FM tower, satellites, or other suitable means. The transmitters 174 include an appropriate communication link 176 to the network 170 and/or service provider 128. This link 176 may be land-based or may be wireless. The transmitters 174 include suitable technology that enables two-way communication between the service provider 128 and the mobile end user computing platforms 130.

The navigation system 110 of FIG. 1 can accommodate different types of end user computing platforms 130. The navigation system 110 of FIG. 1 allows end users who have different types of computing platforms 130 to obtain navigation services from the navigation services provider 128 and to obtain and use geographic data provided from the navigation services provider 128.

II. The Navigation Services Server

Figure 2:
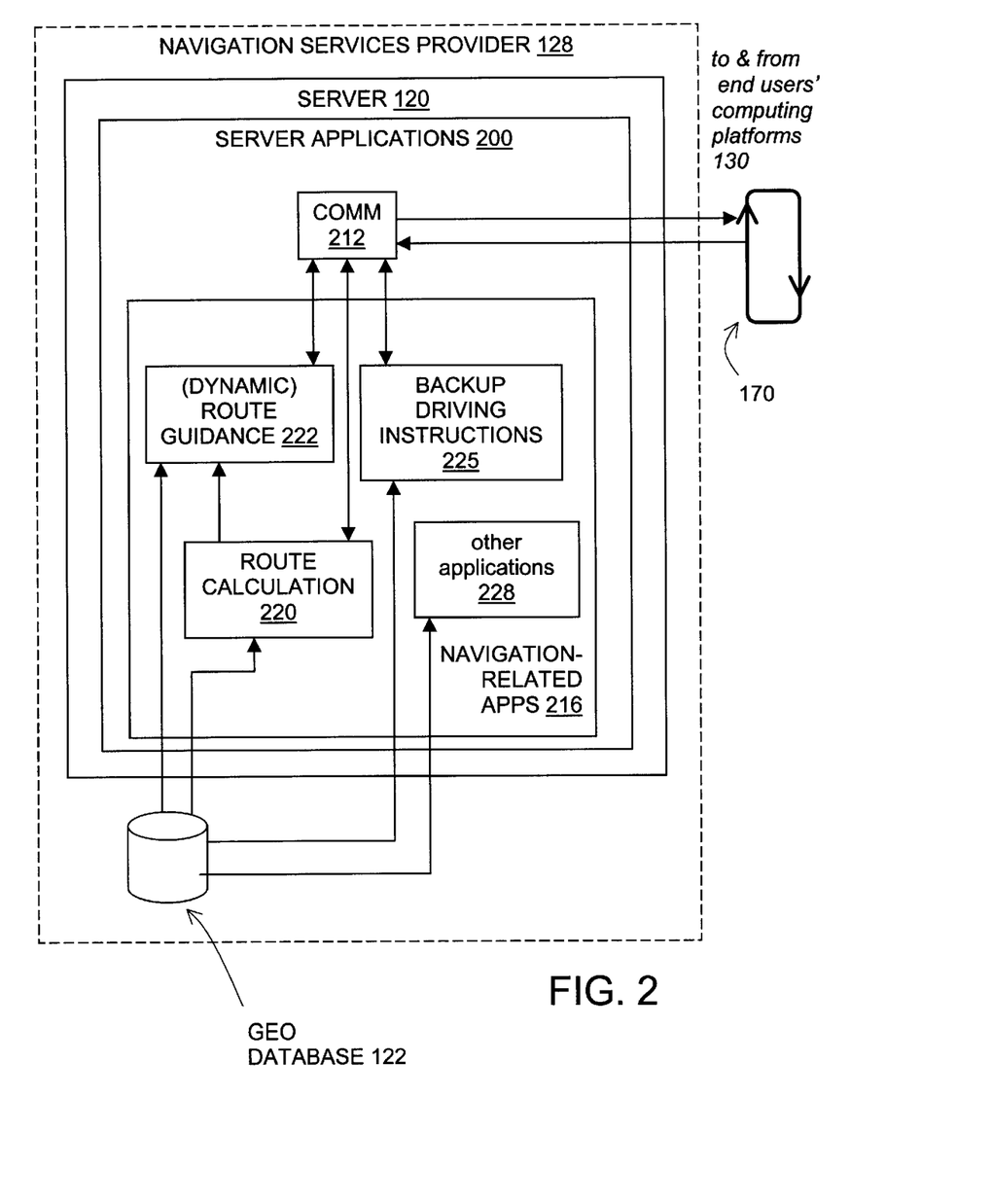
FIG. 2 is a block diagram showing components of the navigation services provider shown in FIG. 1.

FIG. 2 is a block diagram showing some of the software components of the navigation services provider 128. Included on the navigation services server 120 of the navigation services provider 128 are server applications 200. One of the server applications 200 is a communications application 212. The communications application 212 interfaces with the data network 170 in order to receive messages from and send messages to the end users. The communications application 212 may also maintain and manage communications sessions with the end users.

Included among the server applications 200 are navigation-related applications 216. The navigation-related applications 216 use the geographic database 122 associated with the navigation services server 120 in order to provide the various different types of navigation-related services. One of the navigation-related applications 216 is a route calculation application 220. Given data that identify the positions of an origin and destination, the route calculation application 220 calculates a route between the origin and the destination. The route calculation application 220 may use any of various means or algorithms for this purpose. Methods for calculating routes are disclosed in U.S. Pat. No. 6,192,314, the entire disclosure of which is incorporated by reference herein. (The methods disclosed in the aforementioned patent represent only some of the ways that routes can be calculated and the claimed subject matter herein is not limited to any particular method of route calculation. Any suitable route calculation method now known or developed in the future may be employed.)

Regardless of the method used, the route calculation application 220 provides an output in the form of a list identifying a continuous series of roads (or segments thereof) that form a legally valid solution route between an origin and a destination. A "legally valid solution route" conforms to known traffic restrictions, such as one way streets, turn restrictions, etc. The method used by the route calculation application 220 may be designed to optimize the solution route to meet one or more predetermined criteria. Such criteria may include the least travel time, the shortest distance, the fewest turns, etc. If the method used by the route calculation application 220 is designed to find a solution route that is optimized for one or more criteria, then the solution route also ideally meets these one or more criteria.

Another of the navigation applications 216 on the server 120 is a route guidance server application 222. The route guidance server application 222 uses the output from the route calculation application 220 to provide instructions for the end user to travel to the desired destination. Methods for providing route guidance using geographic data are disclosed in U.S. Pat. No. 6,199,013, the entire disclosure of which is incorporated herein by reference.

The route guidance server application 222 provides instructions to end users dynamically. According to this feature, when an end user is provided with instructions for traveling to a destination, the instructions are provided at appropriate times and/or locations as the end user progresses toward the destination. As an example, according to this feature, as the end user approaches an intersection at which a right turn is required, the end user is provided with an instruction "TURN RIGHT AT NEXT INTERSECTION."

There are several ways that can be used by the route guidance server application 222 to support this feature. According to one embodiment, the end user's computing platform includes positioning equipment, such as a GPS system, inertial sensors, wheel pulse sensors, etc. Using this equipment, the end user's computing platform determines the position of the end user. Data that indicate the end user's position are transmitted to the navigation services provider. Using the data that indicate the end user's position, the route guidance server application 222 on the navigation services server 120 determines the appropriate time and location at which to provide a maneuvering instruction. When the end user approaches the position at which the maneuvering instruction is appropriate, the route guidance server application 222 sends data from which the maneuver can be explicated to the end user. When the data from which the maneuver can be explicated are received on the end user's computing platform, an application (i.e., the route guidance client application 270, described below) on the end user's computing platform uses the data to provide the maneuvering instruction to the end user.

According to an alternative mode of operation, the route guidance server application 222 on the navigation services server 120 determines several maneuvers required to be made by the end user in order to travel along a route to the desired destination. The navigation service server sends data from which these maneuvers can be explicated to the end user. The navigation services server also sends data that describe the route. The data that describe the route indicate the road segments that form the route. The end user's computing platform receives the data indicating the route and the data from which maneuvers along the route can be explicated and stores these data locally. The end user's computing platform may have positioning equipment, such as a GPS system, inertial sensors, etc. An application on the end user's platform (e.g., the positioning application 264, described below) uses the data received from the navigation services server to determine the end user's position along the route. Using this information, the application on the end user's computing platform (i.e., the route guidance client application 270, described below) determines the appropriate time and location to provide each maneuvering instruction to the end user.

As stated above, the route guidance server application 222 on the navigation server is capable of providing route guidance dynamically. For example, if changes in traffic conditions affect a route along which an end user is being guided, the route calculation application 220 can calculate a new route. Then, the route guidance server application 222 provides the end user with driving instructions for following the new route that takes into account the changes in traffic conditions.

Another of the navigation applications 216 on the server 120 is a backup driving instructions application 225. The backup driving instructions application 225 may be part of the route guidance server application 222 or may be a standalone application. The backup driving instructions application 225 is described in more detail below.

The navigation services server 120 may include other applications 228.

In order to provide navigation-related features, the route calculation application 220, the route guidance application 222, the backup driving instructions application 225 and the other applications 228 use data from the geographic database 122. The geographic database 122 includes data representing the roads and intersections in the geographic region (100 in FIG. 1) and also includes information relating to the represented roads and intersections, such as turn restrictions at intersections, speed limits along the roads, street names of the various roads, address ranges along the roads, and so on. The geographic database 122 also contains information about points of interest, businesses and other information. The geographic database 122 may be organized to facilitate performing navigation-related functions. Methods of organizing a geographic database to enhance the performance of certain navigation-related functions are described in U.S. Pat. Nos. 5,974,419, 5,968,109 and 5,953,722 the entire disclosures of which are incorporated by reference herein.

III. The End Users' Computing Platforms

Figure 3:
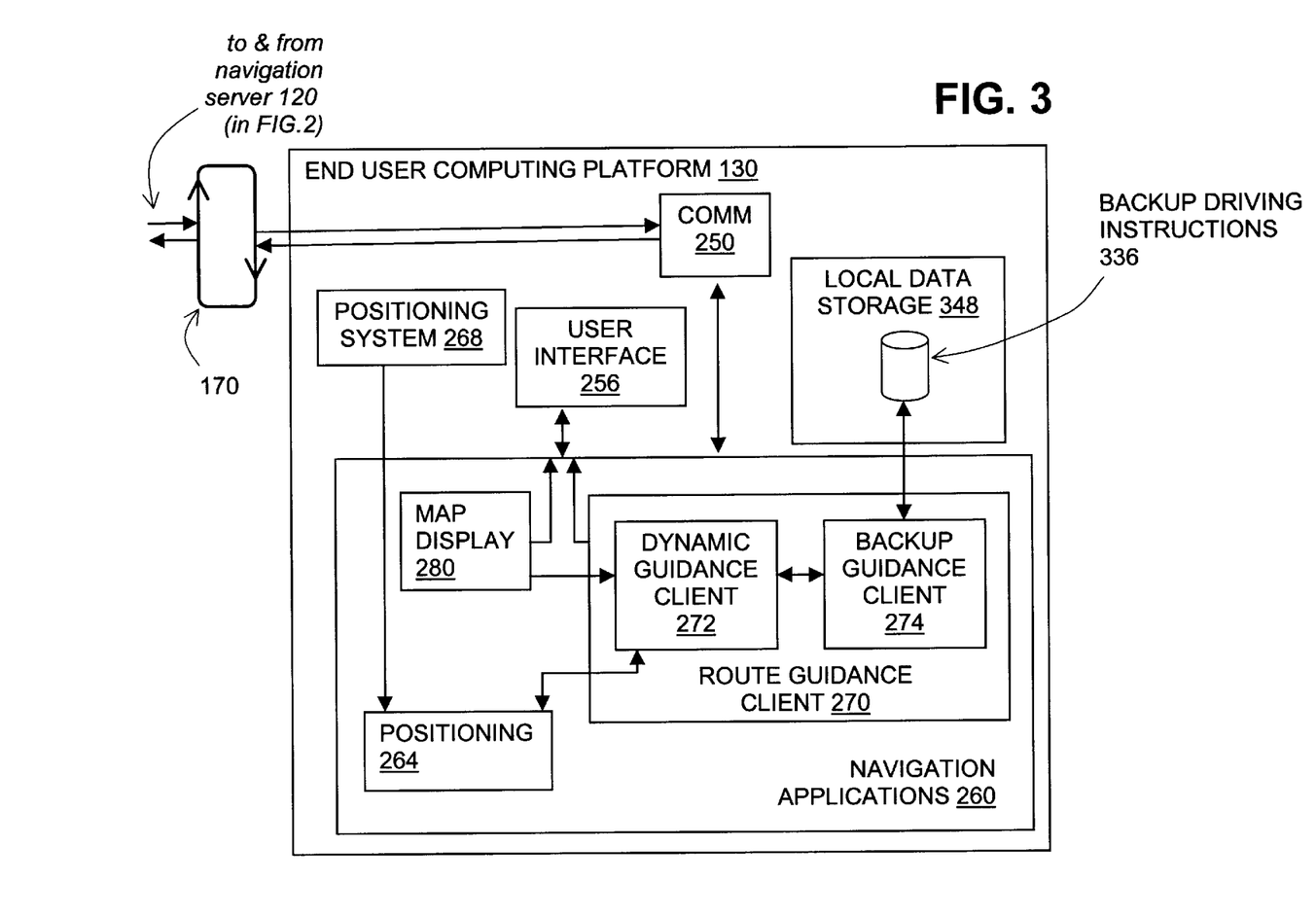
FIG. 3 is a block diagram showing components of one of the end user's computing platforms shown in FIG. 1.

FIG. 3 is a block diagram showing some of the components of one of the end user's computing platforms 130. Different end user computing platforms may have different hardware and software, and accordingly, the navigation-related functions that are performed on the end users' computing platforms may vary from one end user platform to another. The end user's computing platform shown in FIG. 3 represents an exemplary embodiment. It is understood that not all end user computing platforms may necessarily provide all the functions of the embodiment in FIG. 3 and that some end user computing platforms may provide additional or other functions.

Referring to FIG. 3, the exemplary end user's computing platform 130 includes a communications system 250. The communications system 250 in the end user's computing platform 130 includes the hardware and software components needed to receive messages from and send messages to the navigation server (120 in FIGS. 1 and 2) over the data network 170. The communications system 250 interfaces with other components in the end user's computing platform 130.

The end user's computing platform 130 also includes a user interface 256. The user interface 256 allows the end user to provide input to and receive information from the end user's computing platform 130. The user interface 256 includes hardware and software components. For example, the user interface 256 may include a display, a microphone, speakers, a keypad, or other kinds of means for inputting information into the computing platform and outputting information therefrom. The user interface 256 includes supporting software that may provide menus, prompts, audio, etc. The user interface 256 interfaces with other components in the end user's computing platform 130.

Included on the end user's computing platform 130 are navigation-related applications 260. The navigation-related applications 260 use the geographic data obtained from the navigation server 120 to provide various different types of navigation-related services, including route guidance. One of the navigation-related applications 260 is a positioning application 264. The positioning application 264 uses the geographic data obtained from the navigation server 120 to determine the position of the end user's computing platform 130 relative to data representing the road network. The positioning application 264 may also obtain data from a positioning system 268 that is part of the end user's computing platform 130. The positioning system 268 may use GPS, dead-reckoning, or a combination of these or other technologies to determine the location of the end user's computing platform 130. Methods for performing positioning are disclosed in U.S. Pat. No. 6,192,312, the entire disclosure of which is incorporated herein by reference. The positioning application 264 is optional, i.e., not all end users' computing platforms may provide for or support positioning.

Another of the navigation applications 260 on the end user's computing platform is a route guidance client application 270. The route guidance client application 270 uses data from the navigation server 120 to provide instructions to the end user in order to travel to the destination to which a route has been calculated by the route calculation application 220 on the navigation services server 120. The route guidance client application 270 includes two parts. One part of the route guidance client application 270 is the dynamic route guidance client application 272. The other part of the route guidance client application is the backup driving instructions client application 274.

The dynamic route guidance client application 272 uses the dynamic route guidance data provided by the route guidance server application 222. Using the dynamic route guidance data provided by the route guidance server application 222, the dynamic route guidance client application 272 provides route guidance to the end user as the end user follows the calculated route. As an example, using the dynamic route guidance data from the route guidance server application 222, the dynamic route guidance client application 272 explicates a single upcoming maneuver to the end user as the end user approaches the location at which the maneuver is required to be made.

The backup driving instructions client application 274 on the end user's computing platform 130 uses the backup driving instruction data provided by the backup driving instructions application 225. Using the backup driving instructions provided by the backup driving instructions application 225, the backup driving instructions client application 274 provides backup route guidance to the end user. As an example, the backup driving instructions may include text descriptions of all the maneuvers that the driver is required to make in order to reach the destination. The backup driving instructions may not be provided dynamically to the end user by the backup driving instructions client application 274. Instead, the backup driving instructions client application 274 may provide the backup driving instructions for the entire route all at once.

Another of the navigation applications 620 on the end user's computing platform is a map display application 280. The map display application 280 uses data from the navigation services server 120 to provide maps graphically on the display screen of the user interface 256 of the end user's computing platform. The maps may show the area around the location of the end user's computing platform, the area along a route that the end user is following, the area around a location specified by the end user, or any other specified area. Methods for performing map display using geographic data are disclosed in U.S. Pat. Nos. 6,092,076 and 6,163,749, the entire disclosures of which are incorporated herein by reference.

IV. Operation of Embodiment with Backup Driving Instructions

Figure 4:
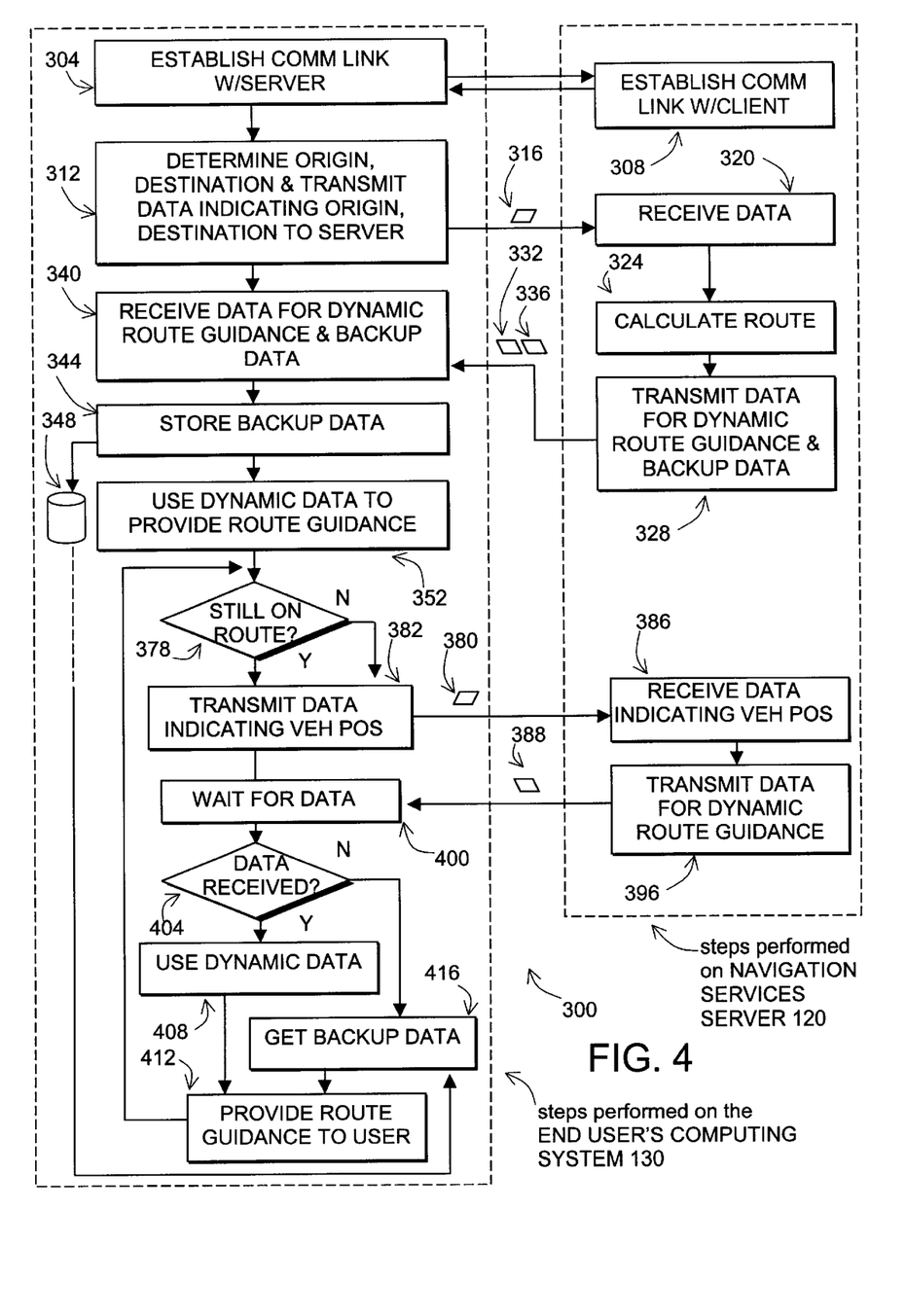
FIG. 4 is a flow chart showing some of the steps performed by the navigation system of FIG. 1.

FIG. 4 shows a process 300 performed by the navigation system 110 (in FIG. 1) to provide end users with dynamic route guidance and, in addition, to provide end users with backup driving instructions.

When an end user wants to receive guidance for traveling to a destination, the end user first operates his/her computing platform to establish a communications link to the navigation services server 120 over the wireless network 176 (Steps 304 and 308).

After establishing a wireless communications link, the end user determines a destination (and possibly an origin) and transmits data indicating the origin and destination to the navigation services server (Step 312). There are several different ways that the end user can use to determine a desired destination. According to one example, the end user specifies an address. According to another example, the end user specifies a type of point of interest (e.g., a restaurant, hotel, gas station, etc.), whereupon the navigation services service finds one or more points of interest of the specified type in proximity to the location of the end user. When determining a destination, the end user may exchange information with the navigation services server.

When specifying an origin, the end user may specify an origin by address. Alternatively, if the origin is the end user's current location, data from the positioning application (264 in FIG. 3) or positioning system (268 in FIG. 3) may be used to indicate the origin.

After the navigation services server 120 receives the data 316 indicating the origin and destination (Step 320), the navigation services server 120 calculates a solution route from the origin to the destination (Step 324). The navigation services server 120 uses the route calculation application (220 in FIG. 2) for this purpose. After calculating the solution route, the navigation services server 120 sends data to the end user from which the end user can be provided with guidance for following the route (Step 328). The navigation services server 120 sends two types of data: dynamic route guidance data 332 and backup driving instruction data 336.

The dynamic route guidance data 332 are used to provide the end user with maneuvering instructions at appropriate locations along the solution route. The dynamic route guidance data 332 may include relatively detailed instructions. As an example, the dynamic route guidance data 332 may include map data from which a map of the area around the end user's location can be rendered on the display of the end user's computing platform. The dynamic route guidance data 332 may also include positioning data relating to the solution route. The positioning data indicate the coordinates of the road segments that form the solution route as well as the coordinates of some road segments located close to the solution route.

The dynamic route guidance data 332 sent by the navigation services server 120 does not include guidance for the entire route. Instead, the dynamic route guidance data 332 pertain to only the next maneuver or the next several maneuvers that the end user is required to make.

The other type of data sent by the navigation services server 120 is backup driving instructions data 336. The backup driving instructions data 336 include driving instructions for the entire route. However, the backup driving instructions data 336 may include less detail than the dynamic route guidance. For example, the backup driving instructions data 336 may include only text descriptions of the maneuvers that the end user is required to make.

The end user receives the dynamic route guidance data 332 and the backup data 336 sent by the navigation services server 120 (Step 340). The backup guidance client 274 on the end user's computing platform 130 stores the backup driving instructions data 336 in a re-writable data storage device 348 (Step 344). The re-writable data storage device 348 may be a flash memory, a hard disk, etc.

The dynamic route guidance client 272 on the end user's computing platform 130 uses the dynamic route guidance data 332 to provide maneuvering instructions to the end user (Step 352). The dynamic route guidance instructions may include audio or visual instructions that indicate the next maneuver required in order to follow the route. The instructions may be presented to the end user as the end user approaches the location of the required maneuver. The dynamic route guidance client 272 may receive input from the positioning application 264 for this purpose. The dynamic route guidance may also use the data 332 for the presentation of a map on the display screen of the user interface 256. The dynamic route guidance client 272 may use the map display application 280 for presentation of the map. The map shown by the dynamic route guidance client 272 shows the area around the end user. The required maneuver may be superimposed on the map.

Figure 5:
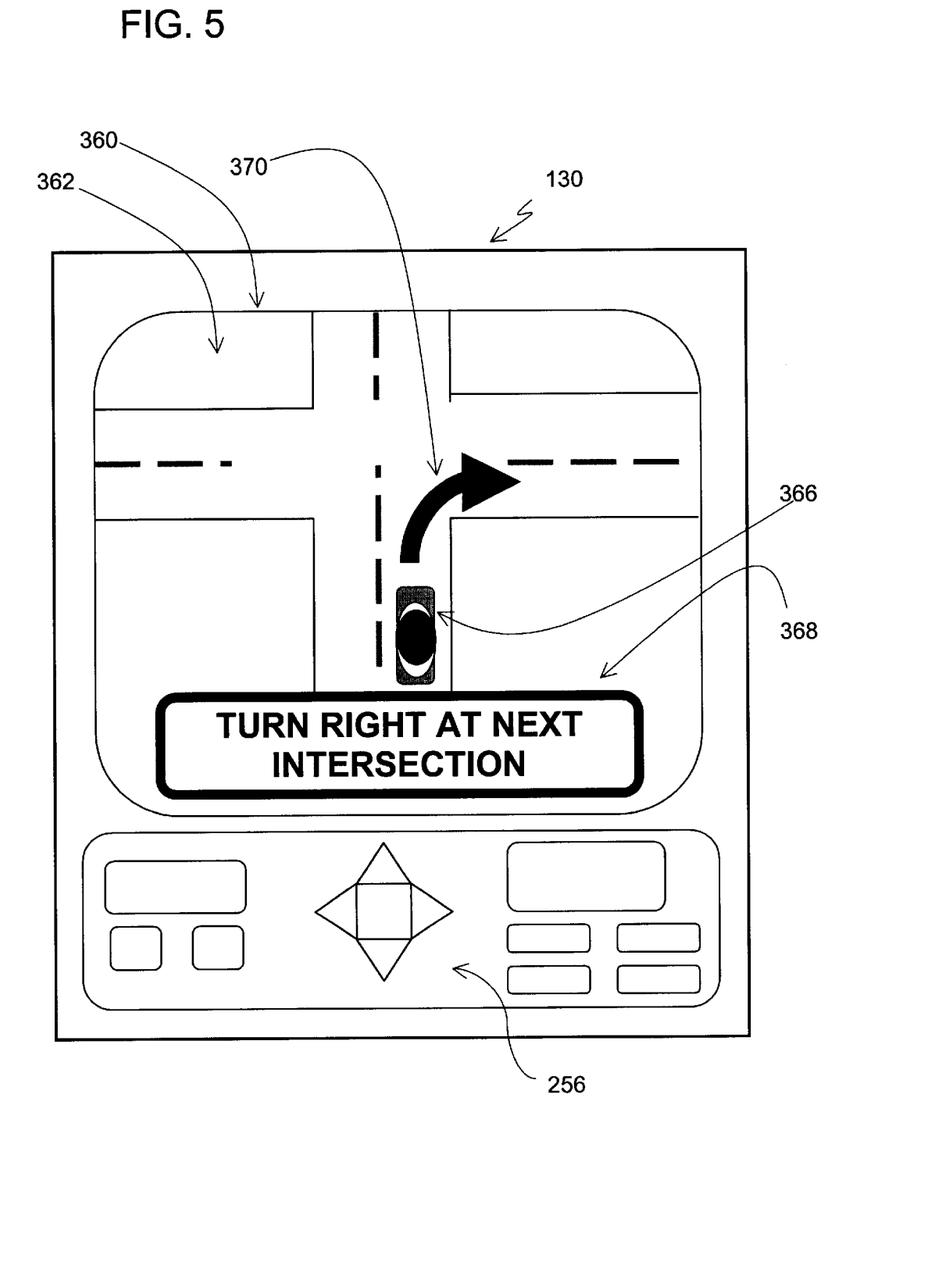
FIG. 5 is an illustration showing an example of dynamic guidance being presented on the display screen of one of the end users' computing platforms of FIG. 1.

FIG. 5 shows an example of the presentation of dynamic route guidance to the end user. FIG. 5 shows the display screen 360 of the end user's computing platform 130. On the display screen 360 is a map 362 showing the area around the end user's location 366. A message 368 is shown on the map 362 indicating the required maneuver. The required maneuver is also illustrated graphically, by means of an arrow 370 superimposed on the map 362.

After the dynamic route guidance client 272 presents the end user with instructions about a maneuver, the route guidance client application 270 determines whether the vehicle is still on the route (Step 378). The route guidance client application 270 sends data 380 indicating the vehicle position to the navigation services server 120 (Step 382). The navigation services server 120 receives the data 380 indicating the vehicle position (Step 386). Using the data 380 indicating the current vehicle position, the navigation services server 120 determines the appropriate upcoming maneuver and transmits data 388 indicating the appropriate upcoming maneuver to the end user's computing platform (Step 396). The data 388 sent by the navigation services server are dynamic route guidance data and accordingly are similar to the dynamic route guidance data 332 that have been sent previously.

The end user's computing platform waits to receive the new dynamic route guidance data 388 (Step 400). If the dynamic route guidance data 388 are received (Step 404), the dynamic route guidance client 272 uses the data 388 to present the end user with new route guidance instructions regarding the next maneuver (Steps 408 and 412). Then, the process 300 continues by looping back to the step (Step 378) in which the route guidance client 270 determines whether the end user is still on the route.

The end user's computing platform 130 may not receive new dynamic route guidance data from the navigation services server. This may occur for various reasons. For example, the end user may travel outside the coverage area of the wireless network (172 in FIG. 1). Alternatively, there may be heavy communications traffic on the network (176 in FIG. 1) that causes delays. According to another alternative, there may be equipment malfunctions or maintenance that temporarily interrupts communications between the end user's computing platform and the navigation services server. Regardless of the reason, if the end user's computing platform does not receive new dynamic route guidance data from the navigation services server, the backup driving guidance client 274 retrieves the backup driving instructions data 336 from the data storage 348 (Steps 404 and 416). Then, the backup guidance client 274 uses the backup driving instructions 336 to provide route guidance to the end user (Step 412).

When the backup guidance client 274 provides route guidance to the end user, the guidance is not as detailed as the route guidance provided by the dynamic route guidance client 272. For example, the backup guidance client 274 may provide only text descriptions of the required maneuvers to the end user. In addition, when the backup guidance client 274 provides route guidance to the end user, the backup driving instructions may not be presented one at a time as the locations at which the maneuvers required to be made are being approached. Instead, when the backup guidance client 274 provides route guidance to the end user, the backup driving instructions may be provided to the end user all at once.

Figure 6:
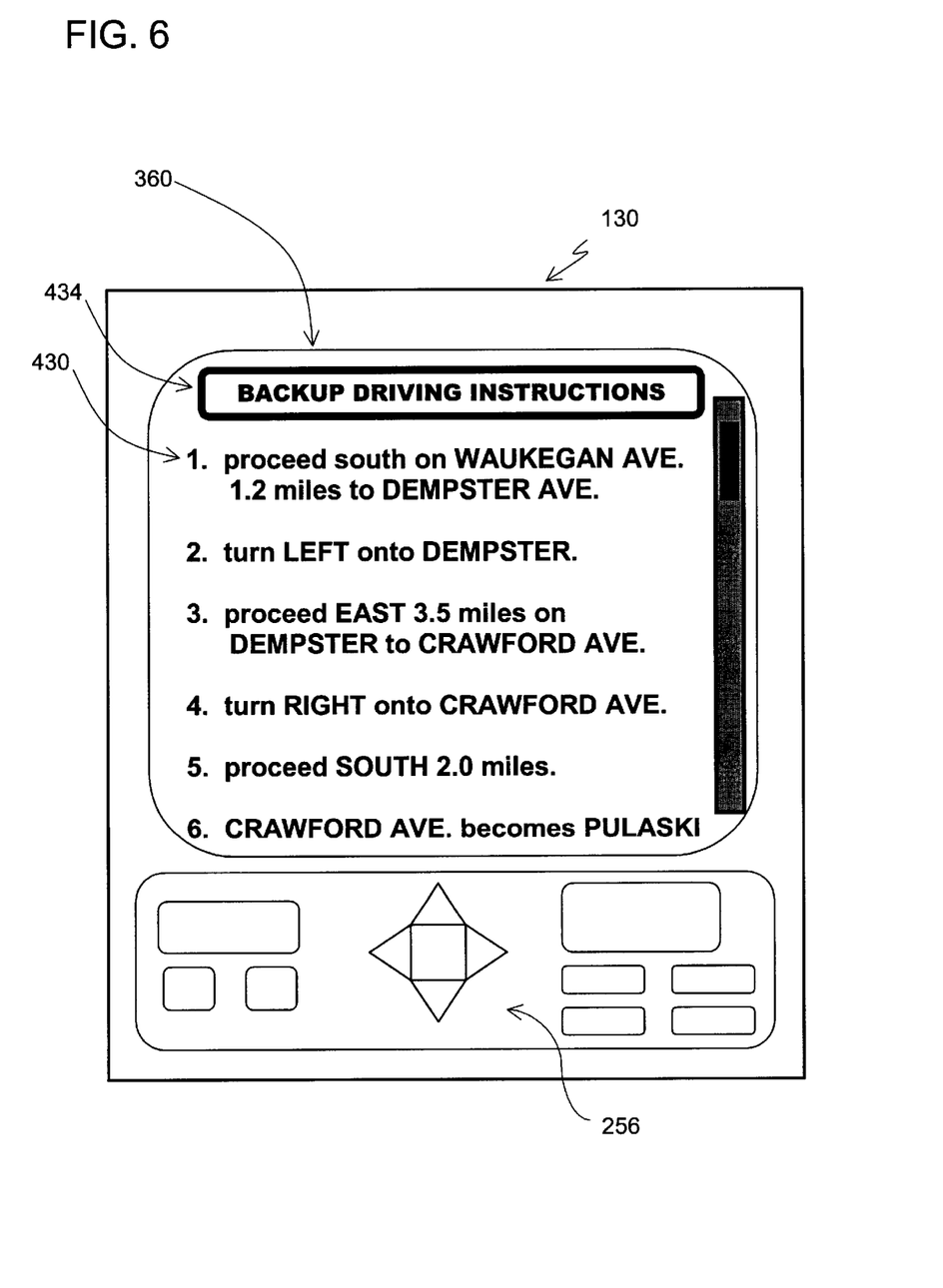
FIG. 6 is an illustration showing an example of backup driving instructions being presented on the display screen of one of the end users' computing platforms of FIG. 1.

FIG. 6 shows an example of the presentation of backup driving instructions to the end user. FIG. 6 shows the display screen 360 of the end user's computing platform 130. On the display screen 360 is a listing 430 of each of the maneuvers required to follow the route. A message 434 is displayed indicating that backup driving instructions are being presented. The display screen 360 may include as many instructions that can reasonably fit on the screen. The rest of the instructions may be viewed by scrolling through the list 430, e.g., using controls on the user interface 256.

After the backup driving instructions are provided to the end user, the process 300 loops back to the steps in which a determination is made whether the vehicle is still on the route (Step 378), the vehicle position is sent to the navigation services server (Step 382), and new dynamic route guidance data from the navigation services server is expected (Step 400). If communications with the navigation services server are reestablished, new dynamic route guidance data are obtained from the navigation services server and dynamic route guidance is provided to the end user (Steps 400, 404, 408, and 412). Otherwise, if communications with the navigation services server are not reestablished, the backup guidance client 274 continues to present the backup driving instructions to the end user (Step 412).

V. Alternatives

In some of the embodiments described above, it was stated that some end user computing platforms included a positioning system and/or a positioning application by which the location of the end user's computing platform could be determined. According to another embodiment, the location of an end user can be determined by a positioning system located outside the end user's computing platform. Systems for determining the position of a user of a wireless communications device are known. For example, there are systems that can determine the positions of users of cellular phones. These systems may determine the location of a cellular phone user who requests emergency service, e.g., "emergency 911 service." These systems use various technologies, such as triangulation, time-of-arrival, etc., in order to determine a position of a cellular phone user. Some of the companies that provide this type of technology include ArrayComm, Inc., Harris Corporation, Corsair Communications, Lockheed Martin Corporation, CELLTRAX, Inc., TruePosition, Inc., Cell-Loc Inc., KSI Inc., and U.S. Wireless Corporation. Any such technology that is presently available or that becomes available in the future may be suitable for the positioning system.

It is intended that the foregoing detailed description be regarded as illustrative rather than limiting and that it is understood that the following claims including all equivalents are intended to define the scope of the invention.

I claim:

1. A method of operation for an end user's mobile computing device that provides navigation-related services to an end user, the method comprising:

on the end user's mobile computing device,
   establishing a wireless communications link with a remotely located navigation services provider,
   requesting from said remotely located navigation services provider data for providing dynamic driving instructions for traveling to a destination;
   obtaining the data for providing dynamic driving instructions from said remotely located navigation services provider; and
   obtaining backup driving instruction data from said remotely located navigation services provider, said backup driving instruction data capable of providing backup driving instructions when the dynamic driving instructions data cannot be obtained through the communications link.

2. The method of claim 1 further comprising:
providing the dynamic driving instructions while the end user is traveling toward the destination.

3. The method of claim 2 wherein the step of providing the dynamic driving instructions includes providing driving instructions approaching locations at which maneuvers are to be made to travel to the destination.

4. The method of claim 1 further comprising:
if the wireless communications link is interrupted while the end user's mobile computing device is traveling toward the destination, providing backup driving instructions using the backup driving instruction data.

5. The method of claim 1 further comprising:
providing backup driving instructions using the backup driving instruction data, wherein the backup driving instructions are text-based instructions.

6. The method of claim 1 further comprising:
from the end user's computing platform, specifying the destination to the remotely located navigation services provider.

7. The method of claim 1 wherein the backup driving instructions data are text-based instructions.

8. The method of claim 1 further comprising:
on the end user's computing device, determining whether the end user's computing device is still on a route to the destination.

9. The method of claim 1 further comprising:
on the end user's computing device, determining a position of the end user's computing device.

10. The method of claim 1 wherein the data for providing dynamic driving instructions and the backup driving instruction data are received together on the end user's computing device.

11. The method of claim 1 wherein the backup driving instruction data are stored in the end user's computing device upon being received.

12. A method of operation for a navigation services provider that provides navigation-related services to end users' mobile computing devices, the method comprising:
from the navigation services provider,
establishing a wireless communications link with an end user's mobile computing device;
receiving a request from the end user's mobile computing device for directions to travel to a destination;
sending an initial portion of route guidance data for traveling to the destination to the end user's mobile computing device via the wireless communications link;
sending subsequent portions of route guidance data for traveling to the destination to the end user's mobile computing device via the wireless communications link as the end user travels toward the destination; and
sending backup driving instruction data to the end user's mobile computing device, said backup driving instruction data capable of providing backup driving instructions without said wireless communication link.

13. The method of claim 12 further comprising:
on the navigation services provider,
receiving from the end user's mobile computing device a specification of the destination.

14. The method of claim 12 further comprising:
on the navigation services provider,
calculating a route to the destination.

15. The method of claim 12 wherein the backup driving instructions data are text-based instructions.

16. The method of claim 12 wherein the step of sending subsequent portions of the route guidance data for traveling to the destination occurs dynamically while the end user travels toward the destination.

17. The method of claim 12 wherein the step of sending subsequent portions of the route guidance data for traveling to the destination occurs when the end user's mobile computing device approaches locations at which maneuvers are to be taken.

18. The method of claim 12 wherein the backup driving instructions data are sent with the initial portion of the route guidance data.

19. The method of claim 12 further comprising:
prior to sending the subsequent portions of the route guidance data, receiving data indicating a location of the end user's mobile computing device.

20. The method of claim 12 wherein the initial portion of the route guidance data and the subsequent portions of the route guidance data include data for providing a map display.

21. A system for providing route guidance to end users comprising:
a navigation services provider;
a wireless communications system connected to the navigation services provider;
end user computing devices each containing hardware and software for communicating with the navigation services provider over the wireless communications system; and
an application on the navigation services provider that provides dynamic route guidance to each end user computing device for traveling to a destination and backup driving instructions for traveling to the destination in case wireless communications is interrupted and not reestablished.

22. A navigation system capable of wirelessly communicating with a remotely located navigation services for providing route guidance to a user of the navigation system, comprising:
a route guidance application that provides route guidance to the user; and
a backup driving instruction component that stores backup driving directions for use when the route guidance cannot be provided to the user.

23. A method of operation for a navigation services provider that provides navigation-related services to end users' mobile computing devices, the method comprising:
establishing a wireless communications link between navigation services provider and an end user's mobile computing device;
receiving a request from the end user's mobile computing device for directions to travel from an origin to a destination;
sending data for providing dynamic driving instructions for traveling to the destination to the end user's mobile computing device via the wireless communications link; and
sending backup driving instruction data to the end user's mobile computing device, wherein the backup driving instruction data provide instructions for traveling from the origin to the destination, said backup driving instruction data capable of providing backup driving instructions when the dynamic driving instructions data cannot be obtained through the communications link.

* * * * *